United States Patent
Haugen

[11] Patent Number: 6,022,220
[45] Date of Patent: Feb. 8, 2000

[54] MEMORY WIRE BRAILLE TACTILE SYSTEM

[76] Inventor: Peter C. Haugen, 2125 33rd St. NE., Arvilla, N. Dak. 58214

[21] Appl. No.: 08/971,911

[22] Filed: Nov. 17, 1997

[51] Int. Cl.[7] .................................................. G09B 21/00
[52] U.S. Cl. ........................................ 434/112; 434/114
[58] Field of Search .................................. 434/112, 113, 434/114; 340/407.1, 407.2

[56] References Cited

U.S. PATENT DOCUMENTS

| | | | |
|---|---|---|---|
| 4,037,200 | 7/1977 | Cranmer | 434/112 X |
| 4,191,945 | 3/1980 | Hannen et al. | 434/114 X |
| 4,700,541 | 10/1987 | Gabriel et al. | |
| 4,761,955 | 8/1988 | Bloch . | |
| 4,932,210 | 6/1990 | Julien et al. | |
| 4,945,727 | 8/1990 | Whitehead et al. | |
| 4,985,692 | 1/1991 | Breider et al. | 434/112 X |
| 5,127,228 | 7/1992 | Swenson . | |
| 5,129,753 | 7/1992 | Wesley et al. | |
| 5,165,897 | 11/1992 | Johnson | 434/112 X |
| 5,226,619 | 7/1993 | Alger . | |
| 5,226,817 | 7/1993 | Nakajima et al. | 434/112 X |
| 5,275,219 | 1/1994 | Giacomel . | |
| 5,286,199 | 2/1994 | Kipke | 434/112 X |
| 5,293,464 | 3/1994 | Hirano et al. | |
| 5,396,769 | 3/1995 | Brudnicki . | |
| 5,410,290 | 4/1995 | Cho . | |
| 5,419,133 | 5/1995 | Schneider . | |
| 5,496,174 | 3/1996 | Garner . | |
| 5,580,251 | 12/1996 | Gilkes et al. | 434/112 X |
| 5,583,478 | 12/1996 | Renzi . | |
| 5,685,721 | 11/1997 | Decker | 434/114 |
| 5,725,379 | 3/1998 | Perry | 434/112 X |
| 5,842,867 | 12/1998 | Hong et al. | 434/113 X |

*Primary Examiner*—Sam Rimell
*Attorney, Agent, or Firm*—Michael S. Neustel

[57] ABSTRACT

A memory wire Braille tactile system for continuously replicating a plurality of Braille characters on a single display which is substantially less costly than conventional prior art and allows the user to maintain their level of touch sensitivity. The inventive device includes a housing having an interior portion, a securing member attached near one end of the housing within the interior portion, a first plate attached to the housing opposite of the securing member, a second plate between the first plate and the securing member, a plurality of contactor shafts slidably projecting through the plates, and a plurality of memory wires connected at one end to the securing member and connected to the contactor shafts opposite thereof. A plurality of compression springs are attached to the contactors for forcing the contactors outward from the first plate. Electrical current is selectively applied to selective memory wires thereby transforming them into an austenitic state which creates the desired Braille characters.

7 Claims, 3 Drawing Sheets

MEMORY WIRE BRAILLE TACTILE SYSTEM

BACKGROUND OF THE INVENTION

1. Field of the Invention

The present invention relates generally to virtual environment devices and more specifically it relates to a memory wire Braille tactile system for continuously replicating a plurality of Braille characters on a single display which is substantially less costly than conventional prior art and allows the user to maintain their level of touch sensitivity.

Shape memory alloys have been know and available for many years and have been proposed as operative in various types of devices. Preferably, the shape memory alloy utilized is a nickel-titanium alloy called Nitinol or Tinel, although copper based alloys have been used in many similar applications. Wires constructed from the memory alloy have a deformed shape when at cooler temperature called its martensitic state and return to their preset shape when heated above a transition temperature range called the austenitic state which the alloy is much stronger and stiffer than when in the martensitic state. When the memory wire is heated above the transition temperature range, the alloy remembers its original preset shape and tends to return to that shape.

2. Description of the Prior Art

There are numerous virtual environment devices. For example, U.S. Pat. No. 5,583,478 to Renzi; U.S. Pat. No. 4,945,727 to Whitehead et al; U.S. Pat. No. 5,496,174 to Garner; U.S. Pat. No. 5,226,619 to Alger; U.S. Pat. No. 5,129,753 to Wesley et al; U.S. Pat. No. 5,419,133 to Schneider; U.S. Pat. No. 4,932,210 to Julien et al; U.S. Pat. No. 4,761,955 to Bloch; U.S. Pat. No. 5,293,464 to Hirano et al; U.S. Pat. No. 5,127,228 to Swenson; U.S. Pat. No. 5,410,290 to Cho; U.S. Pat. No. 5,396,769 to Brudnicki; U.S. Pat. No. 4,700,541 to Gabriel et al; U.S. Pat. No. 5,275,219 to Giacomelall are illustrative of such prior art.

Renzi (U.S. Pat. No. 5,583,478) discloses a virtual environment tactile system comprised of a plurality of individual actuators controlled by a computer and associated drive electronics. Each actuator is comprised of a rare earth magnet and an associated contactor which selectively engages the user's skin resulting in the sensation of touch. Renzi does not utilize memory wires to actuate the contactor and does not allow the user to reposition his or her hand in relation to the contactors to maintain their sensitivity.

Whitehead et al (U.S. Pat. No. 4,945,727) discloses a hydraulic shape member alloy actuator comprising a uniaxial shape memory wire and a pair of hydraulic cylinders in fluid communication with each other. The first hydraulic cylinder is moved from a first position to a second position when the memory wire changes states upon heating.

Wesley et al (U.S. Pat. No. 5,129,753) discloses a shape memory wire latch mechanism for releasably connecting two separable structural members. The shape memory wire disengages the latch elements when heated above its transition temperature which allows the structural members to separate.

While these devices may be suitable for the particular purpose to which they address, they are not as suitable for continuously replicating a plurality of Braille characters on a single display which is substantially less costly than conventional prior art and allows the user to maintain their level of touch sensitivity by allowing the user to reposition their fingers. The prior art teaches complex devices which are costly to construct. Also, because of the complexity of the prior art, they are prone to malfunctioning.

In these respects, the memory wire Braille tactile system according to the present invention substantially departs from the conventional concepts and designs of the prior art, and in so doing provides an apparatus primarily developed for the purpose of continuously replicating a plurality of Braille characters on a single display which is substantially less costly than conventional prior art and allows the user to maintain their level of touch sensitivity.

SUMMARY OF THE INVENTION

A primary object of the present invention is to provide a memory wire Braille tactile system that will overcome the shortcomings of the prior art devices.

Another object is to provide a memory wire Braille tactile system that is constructed from a relatively simple mechanical-electrical structure.

An additional object is to provide a memory wire Braille tactile system that relatively inexpensive to construct.

A further object is to provide a memory wire Braille tactile system that allows the user to maintain their level of touch sensitivity.

Another object is to provide a memory wire Braille tactile system that utilizes the linear movement from memory wires to manipulate spring actuated contactors.

Another object is to provide a memory wire Braille tactile system that is lightweight and portable.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
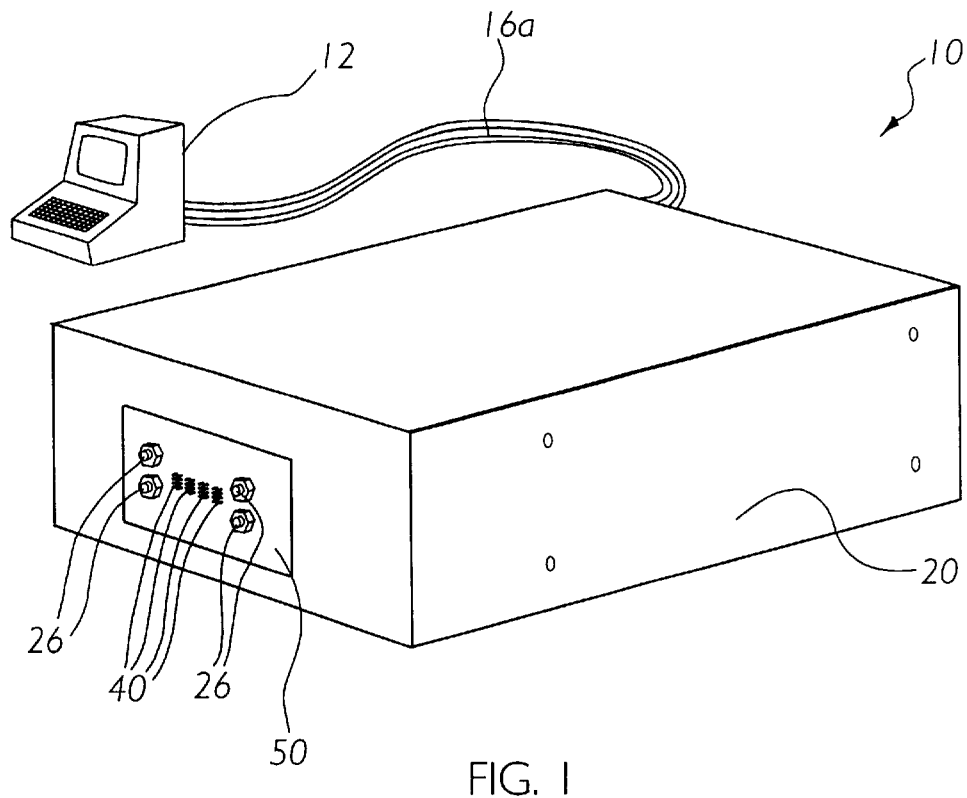
FIG. 1 is an upper front perspective view of the present invention.

Turning now descriptively to the drawings, in which similar reference characters denote similar elements throughout the several view, FIGS. 1 through 4 illustrate a memory wire Braille tactile system 10, which comprises a housing 20 having an interior portion, a securing member 24 attached near one end of the housing 20 within the interior portion, a first plate 50 attached to the housing 20 opposite of the securing member 24, a second plate 52 between the first plate 50 and the securing member 24, a plurality of contactor 40 shafts slidably projecting through the plates 50, 52, and a plurality of memory wires 30 connected at one end to the securing member 24 and connected to the contactor shafts 40 opposite thereof. A plurality of compression springs 60 are attached to the contactors 40 for forcing the contactors 40 outward from the first plate 50. Electrical current is selectively applied to selective memory wires 30 thereby transforming them into an austenitic state which creates the desired Braille characters.

Figure 2:
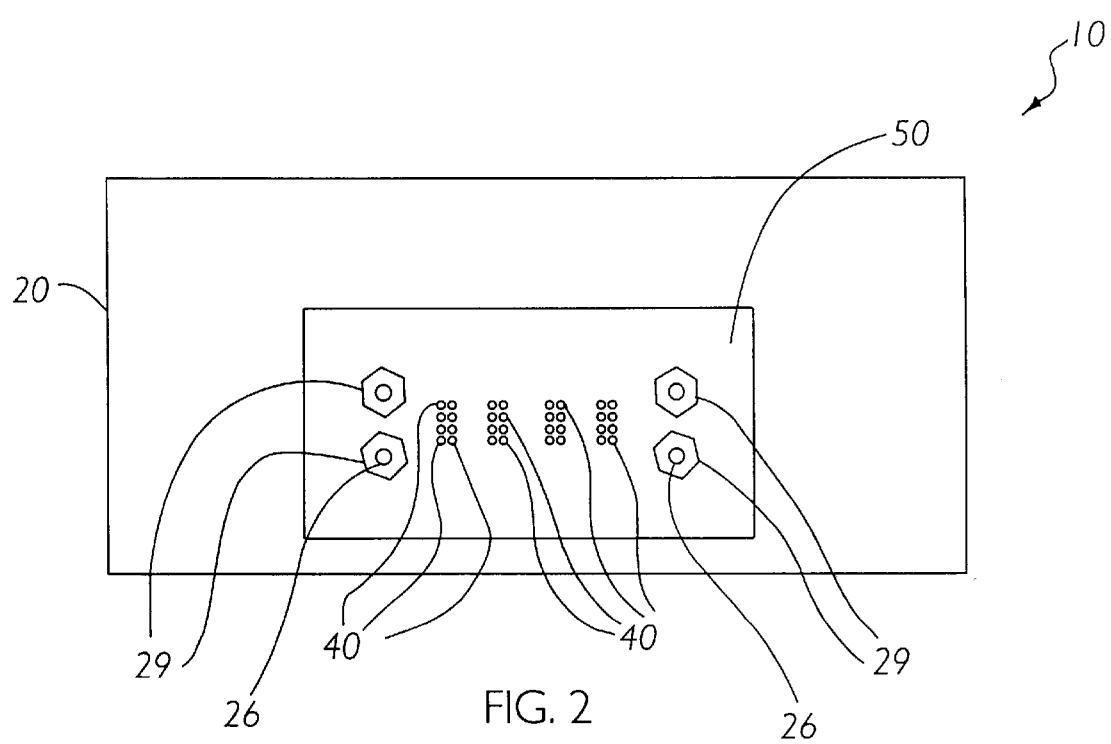
FIG. 2 is a front view of the present invention disclosing the plurality of contactors aligned with respect to one another in potential Braille characters.
Figure 3:
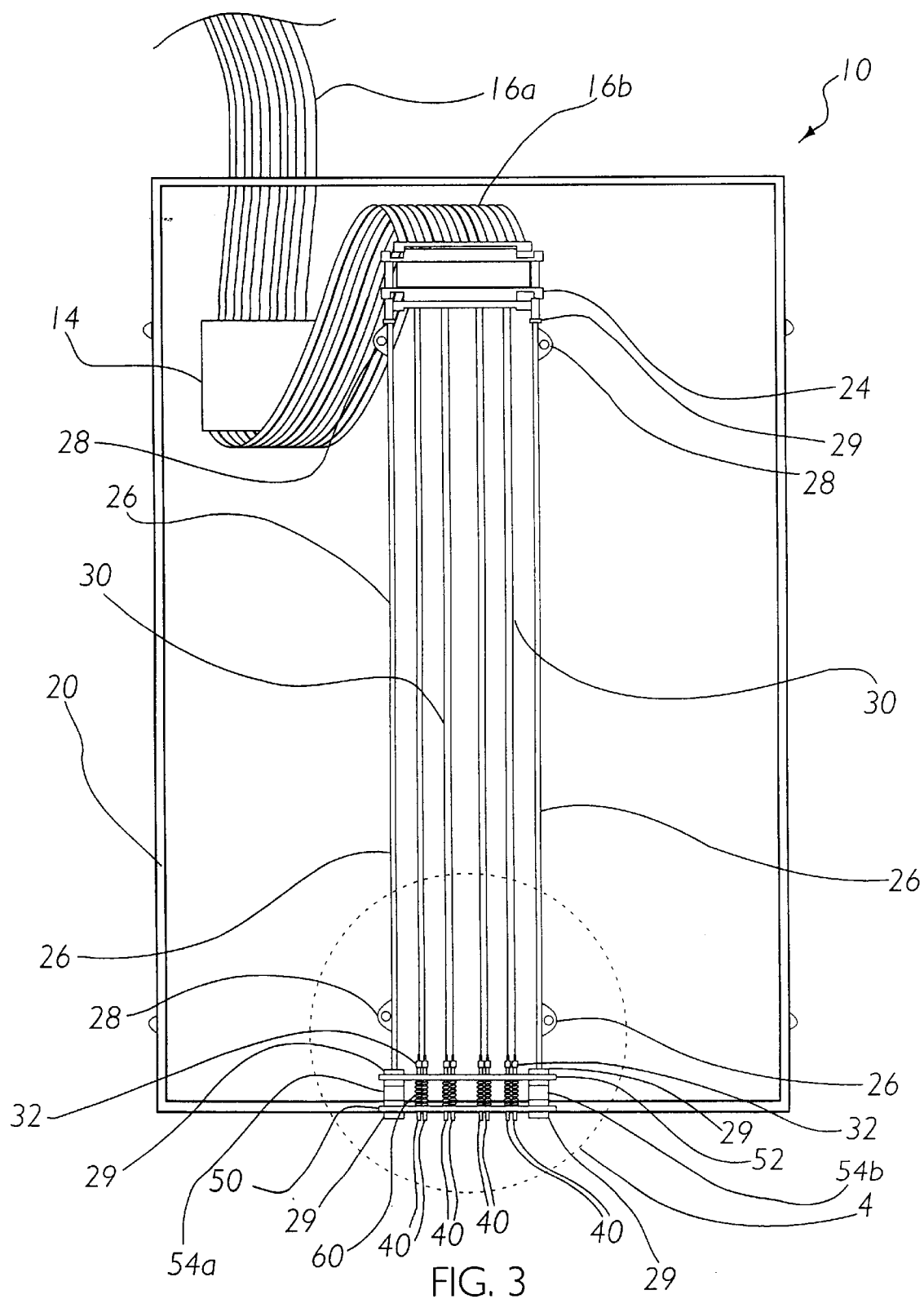
FIG. 3 is a top view of the memory wires connected to the contactors.
Figure 4:
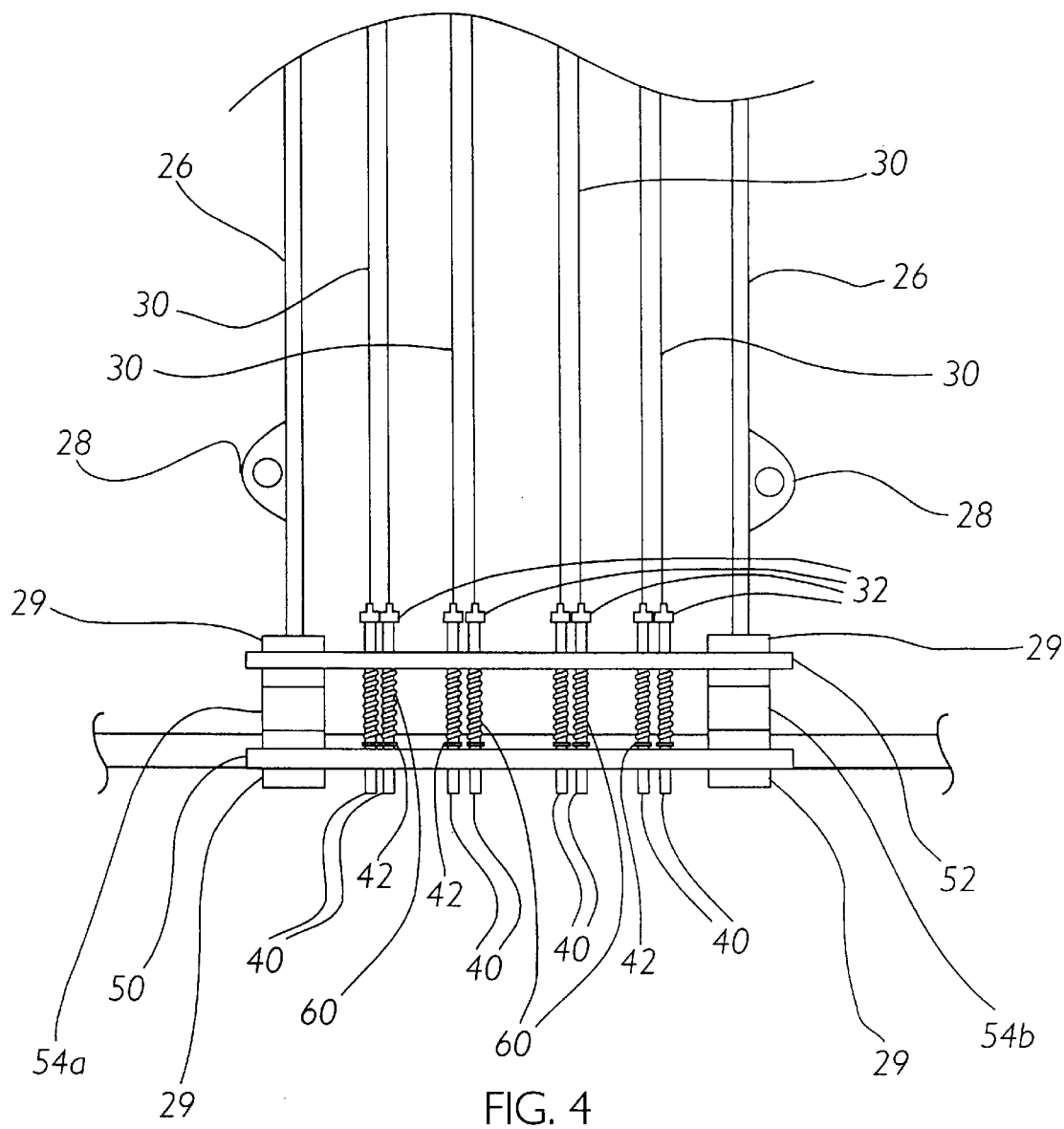
FIG. 4 is a magnified top view from FIG. 3 further disclosing the memory wires connected to the contactors.

As best shown in FIGS. 1 through 3 of the drawings, the housing 20 is preferably rectangular shaped and compact for simple storage and portability. The interior portion of the housing 20 has a floor, four side walls and a ceiling for protecting the interior components which are sensitive to the elements. As shown in FIG. 3 of the drawings, a securing member 24 is attached to the floor at one end of the housing 20. A first plate 50 is attached to the floor opposite of the securing member 24 and preferably parallel to the securing member 24 as best shown in FIG. 3 of the drawings. A second plate 52 is positioned adjacent to and parallel to the first plate 50 as shown in FIGS. 3 and 4 of the drawings. A plurality of spacers 54 are positioned mesial the first plate 50 and the second plate 52 for maintain a space therebetween. As shown in FIGS. 3 and 4, a plurality of rods 26 are attached between the securing member 24 and the first plate 50 and the second plate 52. A plurality of brackets 28 are attached to the rods 26 and are attachable to the floor of the housing 20 as shown in FIG. 3 of the drawings. Nuts 29 are attached to a threaded end of the rods 26 adjacent the first plate 50 and the second plate 52 for retaining the first plate 50 and the second plate 52 in an immovable position with respect to the securing member 24.

As shown in FIG. 3 of the drawings, 32 memory wires 30 are attached at one end to the securing member 24 separated from each other a finite distance. The 32 memory wires 30 extend toward the plates 50, 52 where they are each attached to an attaching sleeve. Preferably, the memory wires 30 are constructed from a nickel-titanium alloy called Nitinol or Tinel, although copper based alloys could be utilized. The memory wires 30 have a deformed shape when at cooler temperatures called its martensitic state and return to their preset shape when heated above a transition temperature range called the austenitic state. When the memory wires 30 are in the austenitic state, they are much stronger and stiffer than when in the martensitic state. When the memory wire 30 is heated above the transition temperature range, the memory wires 30 return to their original preset shape. The preset shape of the memory wire 30 is longer than the deformed shape, thereby allowing the length of each memory wire 30 to be controlled by applying an electrical current to it thereby heating the memory wire 30.

As shown in FIGS. 2 through 4 of the drawings, 32 corresponding contactor 40 shafts slidably project through the first plate 50 and the second plate 52. Each contactor 40 has a rear end and a front end, wherein the front end is exposed through a front face of the first plate 50. The 32 contactors 40 are aligned in parallel groups of eight, wherein each group of eight has two vertical rows of four contactors 40 for providing a tactile feel of a Braille character as best shown in FIG. 2 of the drawings. Each contactor 40 has a cincture 42 near the front end as shown in FIG. 4. The cincture 42 prevents the contactor 40 from extending to far with respect to the front face of the first plate 50, thereby maintaining a uniform extension of each contactor 40 with respect to one another. A compression spring surrounds each contactor 40 between the cincture 42 and the second plate 52 as best shown in FIG. 4. The compression spring forces the contactor 40 outwardly from the first plate 50 when the corresponding memory wire 30 is in the austenitic state. As best shown in FIG. 4, the attaching sleeves 32 are each attached to a rear end of the corresponding contactor 40. The memory wires 30 are slightly tensioned between the securing member 24 and the contactor 40 when the memory wire 30 is in the austenitic state, thereby allowing a quick response time when heated to the martensitic state.

As shown in FIGS. 1 and 3 of the drawings, a computer 12 is electrically connected to an electrical circuitry 14 within the housing 20 by a length of ribbon cable 16a. The computer 12 includes a conventional software program which is well known in the art for controlling 32 outputs. The electrical current applied from the 32 outputs is amplified by the convention electrical circuitry 14 using transistors and other similar electrical circuitry 14 well known in the art. As shown in FIG. 3, the electrical circuitry 14 is electrically connected to the 32 corresponding memory wires 30 through the securing member 24 by a ribbon cable 16b. The ribbon cable 16b provides the amplified electrical current to the memory wires 30 as shown in FIG. 3. The second plate 52 is electrically conductive and is electrically connected to a ground wire which is electrically connected to the electrical circuitry 14 for providing the return current. The attaching sleeves 32 and the contactors 40 are also electrically conductive, thereby providing an electrical circuit for the amplified electrical current to flow through from the memory wires 30.

In use, the computer 12 outputs 32 output electrical signals to the electrical circuitry 14 representing four Braille characters. The 32 output electrical signals are magnified by the electrical circuitry 14 which are electrically connected to the memory wires 30. The memory wires 30 are normally in an austenitic state wherein they are in an elongated deformed shape. When electrical current is passed through selected memory wires 30, the selected memory wires 30 contract into a shorted martensitic state which is their preset shape. The selected memory wires 30 thereby contract and pull the contactors 40 from exposure through the front face of the first plate 50. The pattern of extended and contracted contactors 40 represents four Braille characters which the user may feel with their fingers. The computer 12 then outputs the next set of four Braille characters after a preset delay time. The preset delay time may be adjusted to accommodate for differing Braille reading speeds. Because of the swift response by the memory wires 30, typically a Braille character refresh takes under two seconds to complete. This process continues until the user has read the desired material in Braille.

In an alternative embodiment, an unnumbered switch may be positioned within the first plate 50 which is electrically connected to the computer 12. The computer 12 will wait for the next set of Braille characters until the unnumbered switch is closed, thereby allowing the user to selectively control the speed of the Braille characters displayed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A memory wire Braille tactile system, comprising:

an electrical circuitry means electrically connectable to a computer for receiving and amplifying electrical signals from said computer;

a housing structure having an interior portion;

a memory wire means positioned within said housing structure, wherein said memory wire means is electrically connected to said electrical circuitry opposite of said computer;

a plurality of contactors each having a rear end and a front end, said rear end attached to said memory wire means for representing at least one Braille character;

wherein said memory wire means comprises:

a first member attached within said housing;

a first plate attached within said housing opposite of said first member, wherein said first plate slidably receives said plurality of contactors;

a plurality of memory wires attached between said first member and said rear end of said plurality of contactors, wherein said memory wires have an austenitic state and a martensitic state; and a spring means attached to each of said plurality of contactors for applying force thereupon towards said first plate, thereby exposing said front end of selected contactors thereby forming a Braille character shape.

2. The memory wire Braille tactile system of claim 1, wherein said memory wire means further includes a second plate attached within said housing adjacent said first plate, wherein said plurality of contactors slidably project through.

3. The memory wire Braille tactile system of claim 1, wherein said spring means comprises a plurality of compression springs attached to said plurality of contactors and engaging said second plate.

4. The memory wire Braille tactile system of claim 1, wherein said plurality of contactors each include a cincture near said front end for providing a uniform extension of each contactor exposed from said first plate.

5. The memory wire Braille tactile system of claim 1, wherein at least one rod is extended between said first member and said first plate.

6. The memory wire Braille tactile system of claim 1, wherein said plurality of memory wires a comprised of a nickel-titanium alloy.

7. The memory wire Braille tactile system of claim 1, including at least one spacer between said first plate and said second plate.

* * * * *